United States Patent
Sugitani

(10) Patent No.: US 11,012,627 B2
(45) Date of Patent: May 18, 2021

(54) IMAGE CAPTURING APPARATUS AND CONTROL METHOD THEREOF

(71) Applicant: CANON KABUSHIKI KAISHA, Tokyo (JP)

(72) Inventor: Kuniaki Sugitani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/520,177

(22) Filed: Jul. 23, 2019

(65) Prior Publication Data

US 2020/0036902 A1 Jan. 30, 2020

(30) Foreign Application Priority Data

Jul. 30, 2018 (JP) .............................. JP2018-142903

(51) Int. Cl.
*H04N 5/232* (2006.01)

(52) U.S. Cl.
CPC ..... *H04N 5/23296* (2013.01); *H04N 5/23212* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 6,370,332 B1* | 4/2002 | Kubo | G02B 7/102 348/E5.042 |
| 2009/0136223 A1* | 5/2009 | Motomura | H04N 5/23212 396/77 |
| 2012/0127591 A1* | 5/2012 | Okamoto | G03B 17/00 359/694 |
| 2012/0237193 A1* | 9/2012 | Kawarada | G03B 13/36 396/95 |
| 2014/0210972 A1* | 7/2014 | On | H04N 5/2256 348/65 |
| 2015/0015728 A1* | 1/2015 | Miyazawa | H04N 5/23296 348/208.4 |

FOREIGN PATENT DOCUMENTS

JP 5013705 B2 8/2012
JP 2016-136271 A 7/2016

* cited by examiner

*Primary Examiner* — Quan Pham
(74) *Attorney, Agent, or Firm* — Canon U.S.A., Inc. IP Division

(57) ABSTRACT

A lens apparatus including a focus lens is attachable to and detachable from an image capturing apparatus. An image sensor photoelectrically converts an optical image formed through the lens apparatus. An image generation unit generates an image based on an image signal output from the image capturing apparatus. An image magnification variation correction control unit receives information about a variation in focal length from the lens apparatus by a lens communication control unit configured to control communication with the lens apparatus, and the image magnification variation correction control unit corrects a magnification of the image based on the received information.

18 Claims, 11 Drawing Sheets

FIG.5

| ELEMENT | | | ACTUAL FOCAL LENGTH VARIATION RATE INFORMATION | |
|---|---|---|---|---|
| ZOOM | APERTURE | FOCUS | ACTUAL FOCAL LENGTH | MAXIMUM ACTUAL FOCAL LENGTH |
| Zm_0 | Av_0 | Fcs_0 | FL_000 | MaxFL_00 |
| | | ... | ... | |
| | | Fcs_z | FL_00z | |
| | ... | ... | ... | ... |
| | Av_y | Fcs_0 | FL_0y0 | MaxFL_0y |
| | | ... | ... | |
| | | Fcs_z | FL_0yz | |
| ... | ... | ... | ... | ... |
| Zm_x | Av_0 | Fcs_0 | FL_x00 | MaxFL_00 |
| | | ... | ... | |
| | | Fcs_z | FL_x0z | |
| | ... | ... | ... | ... |
| | Av_x | Fcs_0 | FL_xy0 | MaxFL_0y |
| | | ... | ... | |
| | | Fcs_z | FL_xyz | |

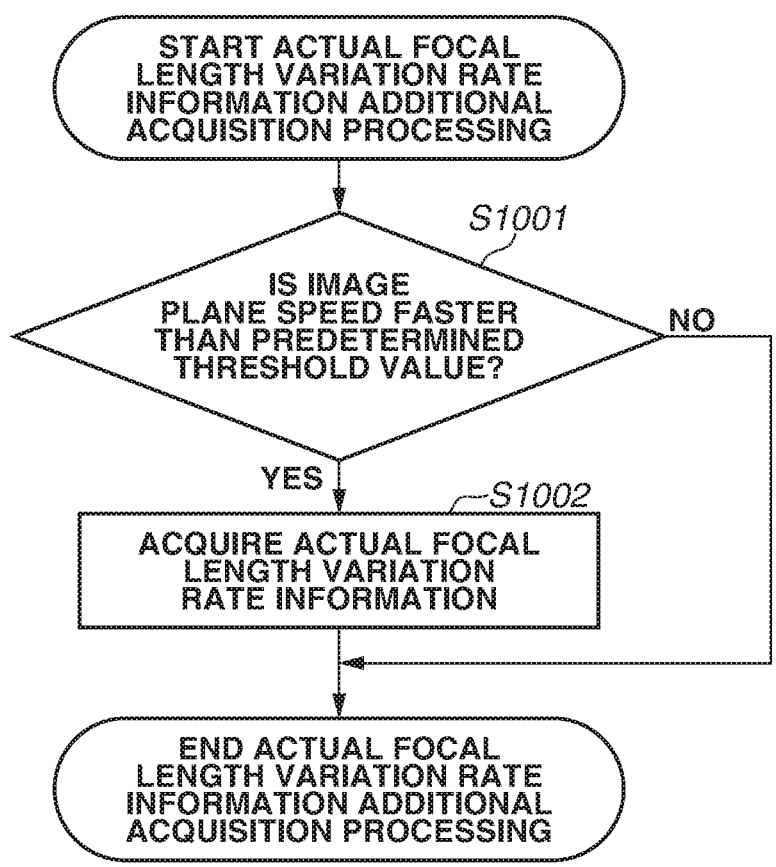

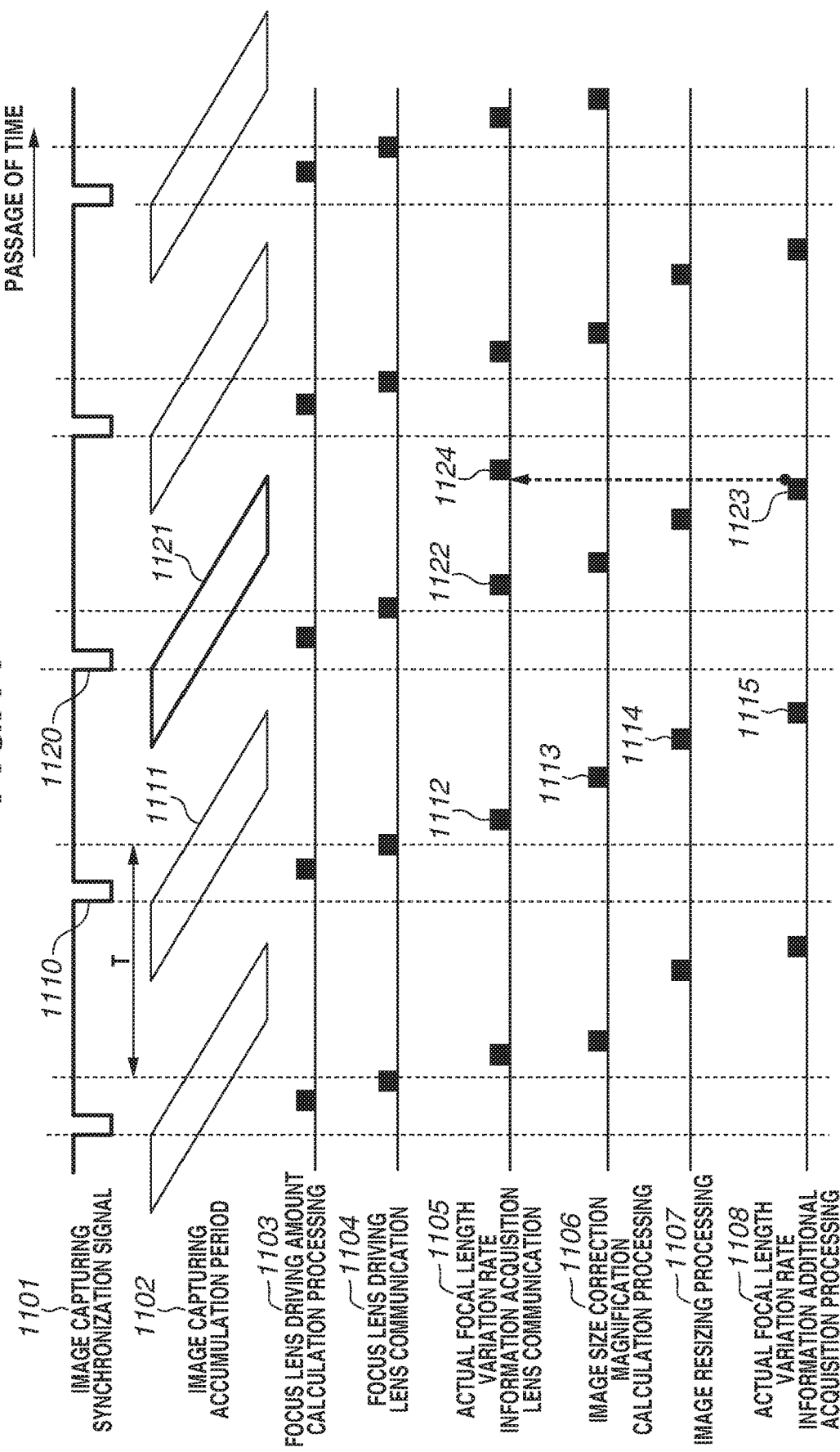

IMAGE CAPTURING APPARATUS AND CONTROL METHOD THEREOF

BACKGROUND OF THE INVENTION

Field of the Invention

The aspect of the embodiments relates to a technique for correcting a variation in image magnification that is caused by a change in focal length of a focus lens in an image capturing apparatus to which a lens apparatus including the focus lens is attachable.

Description of the Related Art

The focal length (hereinafter, also referred to as "actual focal length") of an entire lens optical system in an image capturing apparatus, such as a digital camera, is changed depending on the focal point position of a focus lens as well as a zoom lens. It is known that a change in actual focal length at this time is significant at an inner focus lens. Thus, adjusting a focal point with autofocus (hereinafter, referred to as "AF") causes a variation in angle of view.

This issue is relatively significant especially in a decrease in moving image quality in capturing a moving image. For example, in AF from a large blur state, it is desirable to set a focus driving speed fast, but as the speed is set faster, a variation in angle of view becomes more noticeable. Furthermore, in a case of a low-contrast subject, such as a face, an AF evaluation value is unstable and a search operation period at an in-focus position is often prolonged. Moreover, if the distance to a subject is changed, focus driving is performed in order to maintain an in-focus state. At this time, if a focus driving range is operated in a depth of field, while a change in focal point position is not noticeable, a variation in angle of view is noticeable. As a result, moving image quality decreases.

Techniques for solving the issue, decrease in moving image quality, have been discussed. Examples thereof include correcting an image with correction of a variation in angle of view and limiting a focus lens driving speed such that a variation in angle of view becomes less noticeable.

Japanese Patent No. 5013705 discusses an image capturing apparatus in which the size of each image captured at a different one of focal point positions of a focus lens of a lens-combined camera and generated is converted based on a magnification ratio for each focal point position so that the angle of view of the image is maintained constant.

Japanese Patent Application Laid-Open No. 2016-136271 discusses an image capturing apparatus that transmits a magnification variation value for an image with respect to a unit movement amount of a focus lens to a camera in a system including an interchangeable lens apparatus and the camera, and if the magnification variation value is not less than a predetermined value, the image capturing apparatus does not perform a wobbling operation.

The conventional technique discussed in Japanese Patent No. 5013705 is implementable only for a lens-combined camera and does not consider cases in which various lens apparatuses with different optical systems are attached to the camera.

The technique discussed in Japanese Patent Application Laid-Open No. 2016-136271 merely restrains the focus lens driving so as to make a variation in angle of view less noticeable. Thus, the technique cannot exclude variation in angle of view, and causes a decrease in focus lens driving speed in AF. Furthermore, a maximum possible actual focal length at the focus lens position and an actual focal length at the current focus lens position are not determinable from the magnification variation value for an image with respect to the unit movement amount of the focus lens. Thus, an image capturing apparatus cannot correct the variation in angle of view.

SUMMARY OF THE INVENTION

According to an aspect of the embodiments, an image capturing apparatus to which a lens apparatus including a focus lens is attachable includes an image sensor configured to photoelectrically convert light received via the lens apparatus, a generation unit configured to generate an image based on an image signal output from the sensor, a detection unit configured to detect a focal point state based on the image signal output from the sensor, a first calculation unit configured to calculate, based on the detected focal point state, an image plane speed of a subject and a driving direction of the focus lens, a control unit configured to control driving of the focus lens based on a result of the calculation performed by the first calculation unit, a control unit configured to receive, from the lens apparatus, information corresponding to a variation rate of a focal length at a current position of the focus lens with respect to a maximum possible focal length within a drivable range of the focus lens, a second calculation unit configured to calculate, using the information of a past, an angle-of-view correction magnification of the image at a time point of exposure of the sensor; and a resizer configured to change an angle of view of the image based on the angle-of-view correction magnification.

Further features of the disclosure will become apparent from the following description of exemplary embodiments with reference to the attached drawings.

BRIEF DESCRIPTION OF THE DRAWINGS

FIG. 5 illustrates an actual focal length variation rate information table according to the first exemplary embodiment.

FIG. 10 is a flowchart illustrating a process of additionally acquiring actual focal length variation rate information by an image capturing apparatus according to the third exemplary embodiment.

FIG. 11 is a chart illustrating timings of actual focal length variation rate information additional acquisition lens communication by the image capturing apparatus and a lens apparatus according to the third exemplary embodiment.

DESCRIPTION OF THE EMBODIMENTS

Figure 1:
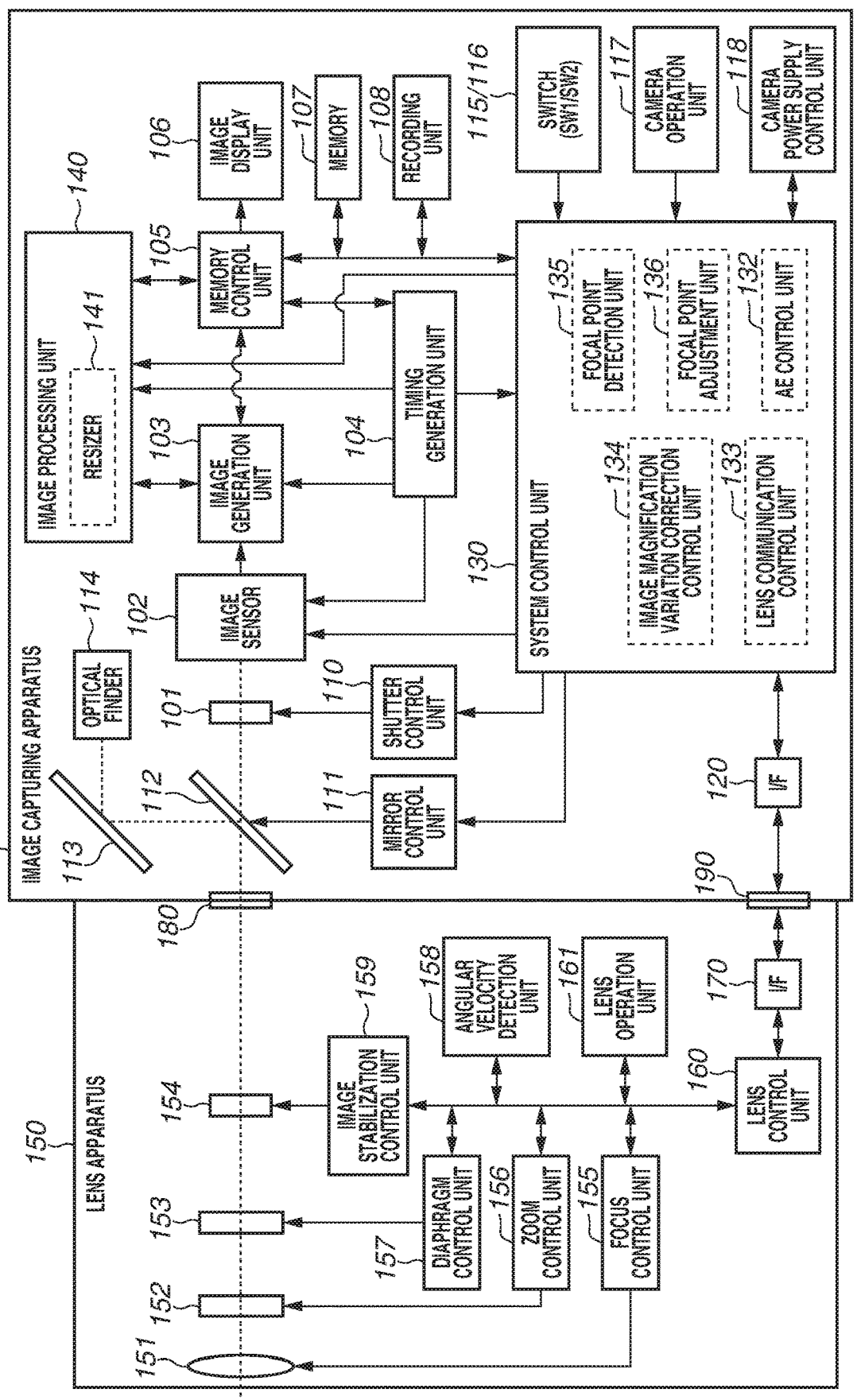
FIG. 1 is a block diagram illustrating an interchangeable camera-lens system according to a first exemplary embodiment.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Various exemplary embodiments of the disclosure will be described below with reference to the attached drawings. A first exemplary embodiment is as described below.

The first exemplary embodiment of the disclosure is directed to an interchangeable camera-lens system including a correction function of correcting a variation in image magnification (angle of view) (hereinafter, also referred to as "focus image magnification variation") due to change in focal length of a focus lens. While the focus lens driving based on a result of focal point detection through an image capturing surface phase difference AF method is assumed herein, the focus lens driving is not limited thereto. For example, contrast AF or manual focus can be employed.

FIG. 1 is a block diagram illustrating a configuration of an interchangeable camera-lens system according to an exemplary embodiment of the disclosure.

As illustrated in FIG. 1, a lens apparatus 150 is attached to an image capturing apparatus 100 according to the present exemplary embodiment via a lens mount unit 180, where the lens apparatus is attachable to and detachable from the image capturing apparatus 100. The lens apparatus 150 includes therein an image capturing optical system including a focus lens 151, a zoom lens 152, a diaphragm 153, and an image stabilization control lens 154. While a single lens is illustrated in FIG. 1, the lens can be a lens group including a plurality of lenses. A light ray that enters through the image capturing optical system is guided to an image sensor 102 and forms an optical image on the image sensor 102.

Next, an internal configuration of the image capturing apparatus 100 will be described below.

The image capturing apparatus 100 includes therein a shutter 101, the image sensor 102, an image generation unit 103, a timing generation unit 104, a memory control unit 105, an image display unit 106, a memory 107, and a recording unit 108. The image capturing apparatus 100 further includes a shutter control unit 110, a mirror control unit 111, main mirror 112, a pentaprism 113, and an optical finder 114. The image capturing apparatus 100 yet further includes a switch-1 115 (hereinafter, "SW1"), a switch-2 116 (hereinafter, "SW2"), a camera operation unit 117, a camera power supply control unit 118, an interface (I/F) 120, a system control unit 130, and an image processing unit 140.

For the image sensor 102, a charge-coupled device (CCD) sensor or complementary metal-oxide semiconductor (CMOS) sensor may be used. The image sensor 102 receives an optical image of a subject formed by an imaging lens including the focus lens 151 and photoelectrically converts the received image into an electric signal. The image sensor 102 can include a plurality of focal point detection pixels.

The image generation unit 103 converts an analog output signal output from the image sensor 102 into a digital signal and generates an image. The generated image is input to the memory control unit 105 and the image processing unit 140.

The timing generation unit 104 feeds a clock signal and a synchronization signal to the image sensor 102, the image generation unit 103, the memory control unit 105, the system control unit 130, and the image processing unit 140.

The memory control unit 105 controls the image generation unit 103, the timing generation unit 104, the image display unit 106, the memory 107, the recording unit 108, and the image processing unit 140. Output data from the image generation unit 103 is written to the memory 107 and the recording unit 108 via the image processing unit 140 and the memory control unit 105.

The image display unit 106 includes a liquid crystal display (LCD). In a case of an electronic viewfinder (EVF), image data captured using an external display apparatus (not illustrated) or the image sensor 102 is sequentially displayed, thus realizing an EVF function. During image reproduction, the images recorded on the memory 107 and the recording unit 108 are displayed.

The memory 107 stores captured still and moving images and is also used as a work area for the system control unit 130.

The recording unit 108 includes a non-volatile memory removable from the inside of the image capturing apparatus 100 or the image capturing apparatus 100, and stores the captured still and moving images.

The shutter control unit 110 controls the shutter 101 in cooperation with the mirror control unit 111 based on a control signal from the system control unit 130.

The mirror control unit 111 controls the main mirror 112 based on a control signal from the system control unit 130.

The main mirror 112 switches a luminous flux having entered through the imaging lens between the finder side and the image sensor side. The main mirror 112 is normally disposed to reflect and guide the luminous flux to the finder side, and when image capturing is performed, the main mirror 112 is jumped up to escape from the luminous path so that the luminous flux is guided to the image sensor 102. The main mirror 112 is configured to be a semitransparent mirror so that a central portion of the main mirror 112 transmits part of the light, and can transmit part of the luminous flux so that the part of the luminous flux enters a focal point detection sensor (not illustrated) configured to detect a focal point.

The pentaprism 113 guides the luminous flux having entered through the imaging lens to an optical finder 114.

The optical finder 114 includes a focusing plate (not illustrated) and an eyepiece lens.

The SW1 instructs the system control unit 130 to start an operation, such as AF processing, auto exposure (AE) processing, or auto white balance (AWB) processing.

The SW2 instructs the system control unit 130 to start exposure. The system control unit 130 having received the instruction to start exposure controls the lens apparatus 150 via the image sensor 102, the memory control unit 105, the shutter control unit 110, the mirror control unit 111, and the I/F 120 and performs processing to record image data on the recording unit 108.

The camera operation unit 117 includes various buttons, a touch panel, and a power supply on/off button, and outputs an instruction received through a user operation to the system control unit 130. The system control unit 130 performs various functions of the image capturing apparatus 100, for example, switching of operation modes, such as an AF mode and an AE mode, according to a user operation through the camera operation unit 117.

The camera power supply control unit 118 manages an external battery and a built-in battery. If a battery is removed or if a remaining battery level becomes low, the camera power supply control unit 118 performs urgent cut-off processing for the camera control. At this time, the system control unit 130 cuts off the supply of power to the lens apparatus 150.

The I/F 120 performs, via a connector 190, communication using an electric signal between the system control unit 130 in the image capturing apparatus 100 and a lens control unit 160 in the lens apparatus 150, thus transmitting and receiving information about the lens apparatus 150 and control instructions.

The system control unit 130 includes an AE control unit 132, a lens communication control unit 133, an image magnification variation correction control unit 134, a focal point detection unit 135, and a focal point adjustment unit 136. In response to the input from the SW1, the SW2, the memory control unit 105, or the camera operation unit 117, the system control unit 130 controls the corresponding configuration. For example, the system control unit 130 controls the entire camera by controlling the lens apparatus 150 via the image sensor 102, the memory control unit 105, the shutter control unit 110, the mirror control unit 111, and the I/F 120.

The AE control unit 132, included in the system control unit 130, controls AE processing of the image capturing apparatus 100. In the AE processing, an AE control amount (diaphragm control amount, shutter control amount, exposure sensitivity) is computed using lens information, such as an open F-number and focal length, acquired from the lens apparatus 150 via the I/F 120 and an input AE evaluation value based on the AE mode. The diaphragm control amount is input to the lens apparatus 150 via a lens communication control unit 133 and the I/F 120. The shutter control amount is input to the shutter control unit 110, and the exposure sensitivity is input to the image sensor 102. For example, in a case of a finder imaging mode, the AE control amount is computed from an AE evaluation value obtained by causing an optical subject image to enter a brightness determination unit (not illustrated) via the main mirror 112 and the pentaprism 113. In a case of a live view imaging mode, the AE control amount is computed from an AE evaluation value computed by the image processing unit 140. Further, an AE frame position for which an evaluation value is to be computed and a weighting amount are changed based on a photometry mode, such as an evaluation photometry mode, mean photometry mode, or face detection photometry mode.

The lens communication control unit 133, included in the system control unit 130, controls communication processing between the image capturing apparatus 100 and the lens apparatus 150. If an attachment of the lens apparatus 150 is detected via the I/F 120, the image capturing apparatus 100 and the lens apparatus 150 start communication and receive lens information at a predetermined timing, and transmit, for example, camera information and a driving instruction. For example, in the case of the finder imaging mode, communication with the lens apparatus 150 is performed at a predetermined timing under the control of the system control unit 130. At this time, in the case of the live view imaging mode, communication can be performed not only at the predetermined timing but also a timing based on an image capturing synchronization signal output from the timing generation unit 104. In the case of performing communication at the timing based on the image capturing synchronization signal, if the image capturing synchronization signal is input from the timing generation unit 104, lens information (focus lens position, focus lens state, diaphragm state, focal length) is collectively received.

The image magnification variation correction control unit 134 is an example of a second calculation unit. The image magnification variation correction control unit 134 receives, via the I/F 120, focal length variation rate information with respect to the maximum possible focal length within the drivable range of the focus lens 151 in the lens apparatus 150. The information includes a focal length variation rate at the current position of the focus lens 151. The image magnification variation correction control unit 134 calculates an angle-of-view correction magnification based on the plurality of pieces of received focal length variation rate information and sets the angle-of-view correction magnification to a resizer 141 in the image processing unit 140.

The focal point detection unit 135, included in the system control unit 130, calculates a focal point state based on a sensor-output signal. For example, in a case of a phase difference AF method, the focal point detection unit 135 calculates a focal point state (defocus amount) based on an image signal obtained by an optical subject image being caused to enter a phase difference AF sensor (not illustrated) via the main mirror 112 and a sub-mirror (not illustrated) for focal point detection. In the case of the image capturing surface phase difference AF method, a pair of image signals having parallax is acquired based on the output from the plurality of focal point detection pixels embedded in the image sensor 102. The focal point detection unit 135 then detects focal point using the phase difference method based on the pair of image signals, thus calculating the focal point state (defocus amount). In a case of a contrast AF method, the contrast AF evaluation value computed by the image processing unit 140 is calculated as the focal point state.

The focal point adjustment unit 136, included in the system control unit 130, is an example of a first calculation unit. The focal point adjustment unit 136 computes the image plane position of the subject, image plane speed, and focus lens driving amount based on the focal point state calculated by the focal point detection unit 135 and the lens information, such as the focus position and focal length acquired from the lens apparatus 150 via the I/F 120.

The image processing unit 140 performs predetermined pixel interpolation processing and color conversion processing on a digital image signal from the image generation unit 103 or data from the memory control unit 105, and generates image data. The image processing unit 140 performs predetermined computation processing using the digital image signal. The image processing unit 140 includes the resizer 141.

The resizer 141 changes the angle of view for the digital image signal from the image generation unit 103 or the data from the memory control unit 105 based on the angle-of-view correction magnification set by the image magnification variation correction control unit 134. Examples of a method for changing the angle of view include cutting part of the digital image signal output from the image generation unit 103 and cutting part of the data read from the memory control unit 105 based on the angle-of-view correction magnification.

Next, an internal configuration of the lens apparatus 150 will be described below. The lens apparatus 150 includes therein the focus lens 151, the zoom lens 152, the diaphragm 153, the image stabilization control lens 154, a focus control unit 155, a zoom control unit 156, a diaphragm control unit 157, an angular velocity detection unit 158, an image stabilization control unit 159, the lens control unit 160, a lens operation unit 161, and the I/F 170.

The focus lens 151 is moved in an optical axis direction and changes the focus of the image capturing optical system.

The zoom lens 152 is moved in the optical axis direction and changes the focal length of the image capturing optical system.

The diaphragm 153 has a variable aperture diameter (aperture value) and changes a light quantity based on the aperture diameter.

The image stabilization control lens 154 is moved in a direction orthogonal to the optical axis direction so that an image blur caused by a camera shake such as a handshake is reduced.

The focus control unit 155 is controlled by the lens control unit 160 or a lens operation unit 161 and drives the focus lens 151. The focus control unit 155 outputs focus information, such as the position of the focus lens 151, to the lens control unit 160.

The zoom control unit 156 is controlled by the lens control unit 160 or the lens operation unit 161 and drives the zoom lens 152. The zoom control unit 156 outputs zoom information, such as the focal length, to the lens control unit 160.

The diaphragm control unit 157 is controlled by the lens control unit 160 or the lens operation unit 161 and drives the diaphragm 153. The diaphragm control unit 157 outputs diaphragm information, such as the aperture value, to the lens control unit 160.

The angular velocity detection unit 158 is controlled by the lens control unit 160, detects the angular velocity (yaw, pitch) of the lens, and outputs the angular velocity to the lens control unit 160.

The image stabilization control unit 159 is controlled by the lens control unit 160 and drives the image stabilization control lens 154. The image stabilization control unit 159 outputs image stabilization information, such as a possible range of image stabilization, to the lens control unit 160.

The lens control unit 160 controls the entire lens by controlling the focus control unit 155, the zoom control unit 156, the diaphragm control unit 157, the angular velocity detection unit 158, and the image stabilization control unit 159 based on the input from the lens operation unit 161 or an I/F 170. The lens control unit 160 transmits information input from the control units or the detection units to the image capturing apparatus 100 via the I/F 170 according to a lens information acquisition instruction received via the I/F 170. The lens control unit 160 computes the maximum possible focal length within the drivable range of the focus lens 151 using the focus information and the zoom information output from the focus control unit 155 and the zoom control unit 156. The lens control unit 160 computes the focal length variation rate at the current position of the focus lens 151. The lens control unit 160 transmits the computation result to the image capturing apparatus 100 via the I/F 170. At this time, the computation results of the maximum focal length and the focal length variation rate can be transmitted based on and in response to a request from the image capturing apparatus 100.

The lens operation unit 161 includes a focus operation ring, a zoom operation ring, an autofocus/manual-focus (AF/MF) switch, and an image stabilization (IS) on/off switch and outputs an instruction received through a user operation to the lens control unit 160. The lens control unit 160 transmits information about the user operation to the image capturing apparatus 100 via the I/F 170 based on the instruction input via the lens operation unit 161. The system control unit 130 in the image capturing apparatus 100 receives the information about the user operation via the I/F 120 and switches an operation mode with respect to the various functions of the lens apparatus 150.

The I/F 170 performs communication using electric communication between the system control unit 130 in the image capturing apparatus 100 and the lens control unit 160 in the lens apparatus 150 via the connector 190 and transmits and receives information about the lens apparatus 150 and a control instruction.

Figure 2:
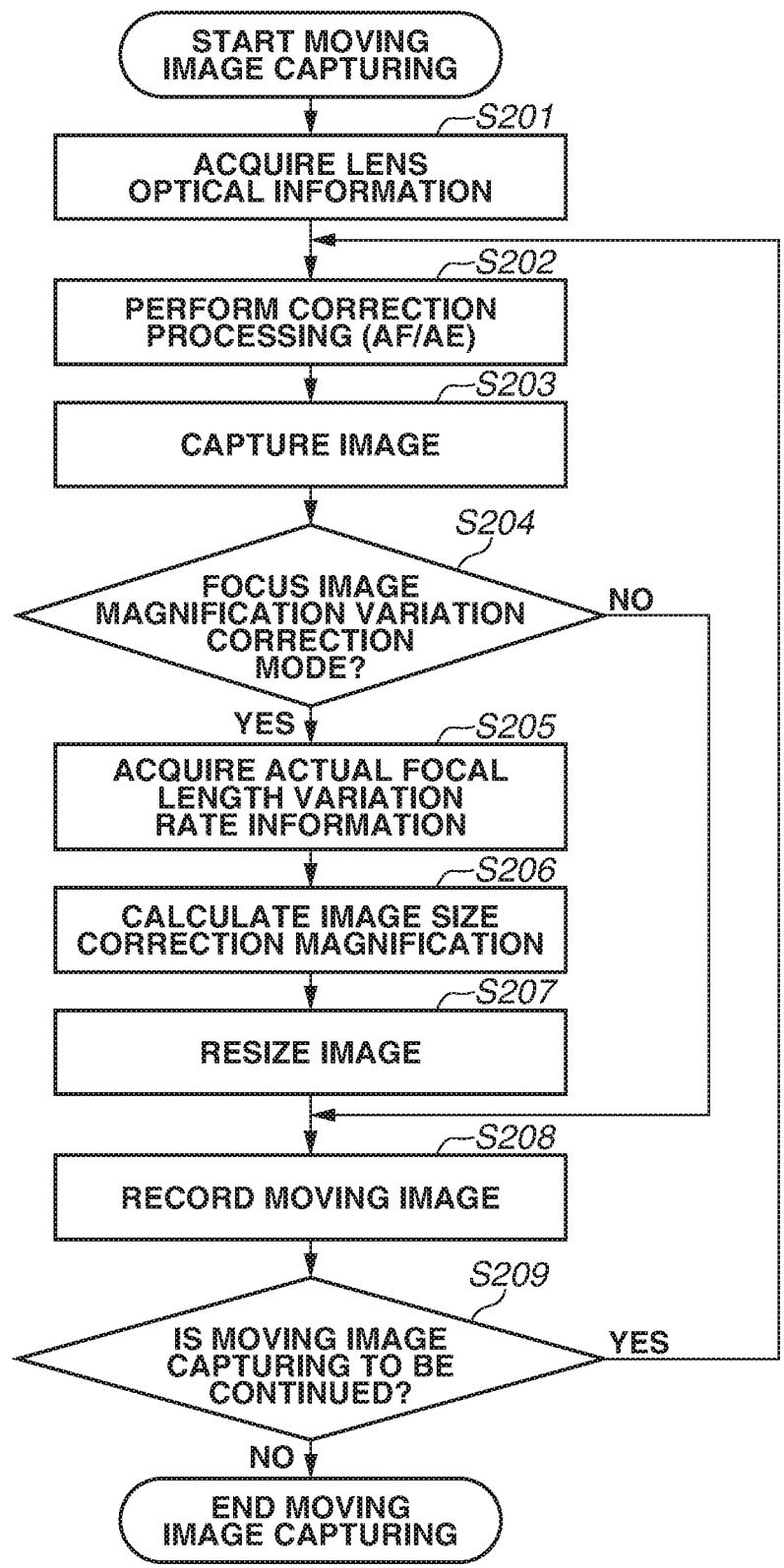
FIG. 2 is a flowchart illustrating a process of capturing a moving image by the interchangeable camera-lens system according to the first exemplary embodiment.

Referring now to a flowchart illustrated in FIG. 2, a description will be provided of an operation of focus image magnification variation correction processing performed by the image capturing apparatus 100 and the lens apparatus 150 according to the present exemplary embodiment. The moving image capturing start processing is the processing at the time of a start of moving image capturing by the image capturing apparatus 100.

In step S201, the system control unit 130 acquires lens optical information from the lens apparatus 150 via the I/F 120, and the processing proceeds to step S202. The lens optical information includes information about lens performance and functions, such as the focal length, aperture, and the existence or nonexistence of a blur correction function. There are cases in which actual focal length variation rate information (described below) is acquired.

In step S202, the system control unit 130 controls the focal point detection unit 135, the focal point adjustment unit 136, and the AE control unit 132 to thereby perform correction processing such as AF processing and AE processing, and the processing proceeds to step S203. In the AF processing and AE processing, the lens control amount is calculated based on the lens optical information described above and, when necessary, the lens information acquired from the lens apparatus 150. The system control unit 130 performs control instruction communication with the lens apparatus 150. In the AF processing, the image plane speed of the subject is calculated. While the image capturing surface phase difference AF method is assumed to be used in the AF processing in the present exemplary embodiment, the method is not limited thereto.

In step S203, the system control unit 130 performs image capturing processing to acquire image data, and the processing proceeds to step S204. The image data is acquired via the image sensor 102 and the image generation unit 103 and is recorded on the memory 107 via the image processing unit 140 and the memory control unit 105.

In step S204, the system control unit 130 determines whether the image capturing apparatus 100 is in a focus image magnification variation correction mode. If it is determined that the image capturing apparatus 100 is in the focus image magnification variation correction mode (YES in step S204), the processing proceeds to step S205. If not (NO in step S204), the processing proceeds to step S207.

In step S205, the system control unit 130 acquires the actual focal length variation rate information from the lens apparatus 150 via the I/F 120, and the processing proceeds to step S206. The actual focal length variation rate information is used for acquiring a change rate (actual focal length variation rate) of a focal length (hereinafter, referred to as "actual focal length") in the current image capturing optical system with respect to the maximum possible focal length (hereinafter, referred to as "maximum actual focal length") within the drivable range of the focus lens 151.

At this time, the actual focal length variation rate is calculable as specified by formula (1) below.

[Formula 1]

$$\text{Actual Focal Length Variation Rate} = \text{Actual Focal Length}/\text{Maximum Actual Focal Length} \quad (1)$$

Specifically, the actual focal length variation rate information is information different from the magnification variation value of the image with respect to the unit movement amount of the focus lens that is used to limit the focus lens driving speed in the conventional technique.

According to an aspect of the present exemplary embodiment, the actual focal length variation rate is calculated by the lens apparatus 150, and the actual focal length variation rate information including the actual focal length variation rate is transmitted from the lens apparatus 150 to the image capturing apparatus 100. The present exemplary embodiment, however, is not limited thereto.

For example, according to another aspect of the present exemplary embodiment, the actual focal length variation rate information including the maximum actual focal length and the actual focal length is transmitted from the lens apparatus 150 to the image capturing apparatus 100, and the image capturing apparatus 100 calculates the actual focal length variation rate.

According to yet another aspect of the present exemplary embodiment, in step S201, a table of the actual focal length and the maximum actual focal length, which change based on optical state information, or a table of the actual focal length variation rate is transmitted from the lens apparatus 150 to the image capturing apparatus 100. Further, in step S204, current optical state information is transmitted from the lens apparatus 150 to the image capturing apparatus 100 to calculate the actual focal length variation rate from the table received in step S201 and the optical state information received in step S204 by the image capturing apparatus 100. At this time, the optical state information includes information about the positions and aperture values of the focus lens 151 and the zoom lens 152.

In step S206, the system control unit 130 calculates an estimated actual focal length variation rate based on two or more pieces of actual focal length variation rate information of the past. The system control unit 130 calculates, from the estimated actual focal length variation rate, an image size correction magnification for correcting a variation in angle of view that is caused by the focus lens driving, and the processing proceeds to step S207. A method for calculating the estimated actual focal length variation rate will be described below with reference to FIG. 4.

In step S207, the system control unit 130 causes the image processing unit 140 to perform resizing processing on the image data recorded on the memory 107 based on the image size correction magnification calculated in step S206, and the processing proceeds to step S208. The resizer 141 performs the resizing processing by cutting part of the image data recorded on the memory 107 based on the image size correction magnification.

In step S208, the image data recorded on the memory 107 is recorded as a moving image file, and the processing proceeds to step S209.

In step S209, the system control unit 130 determines whether the moving image capturing is to be continued. If it is determined that the moving image capturing is to be continued (YES in step S209), the processing proceeds to step S202. If not (NO in step S209), the image capturing process ends.

Performing the above-described process enables the interchangeable camera-lens system to realize correction of a variation in focus image magnification during moving image capturing.

Figure 3:
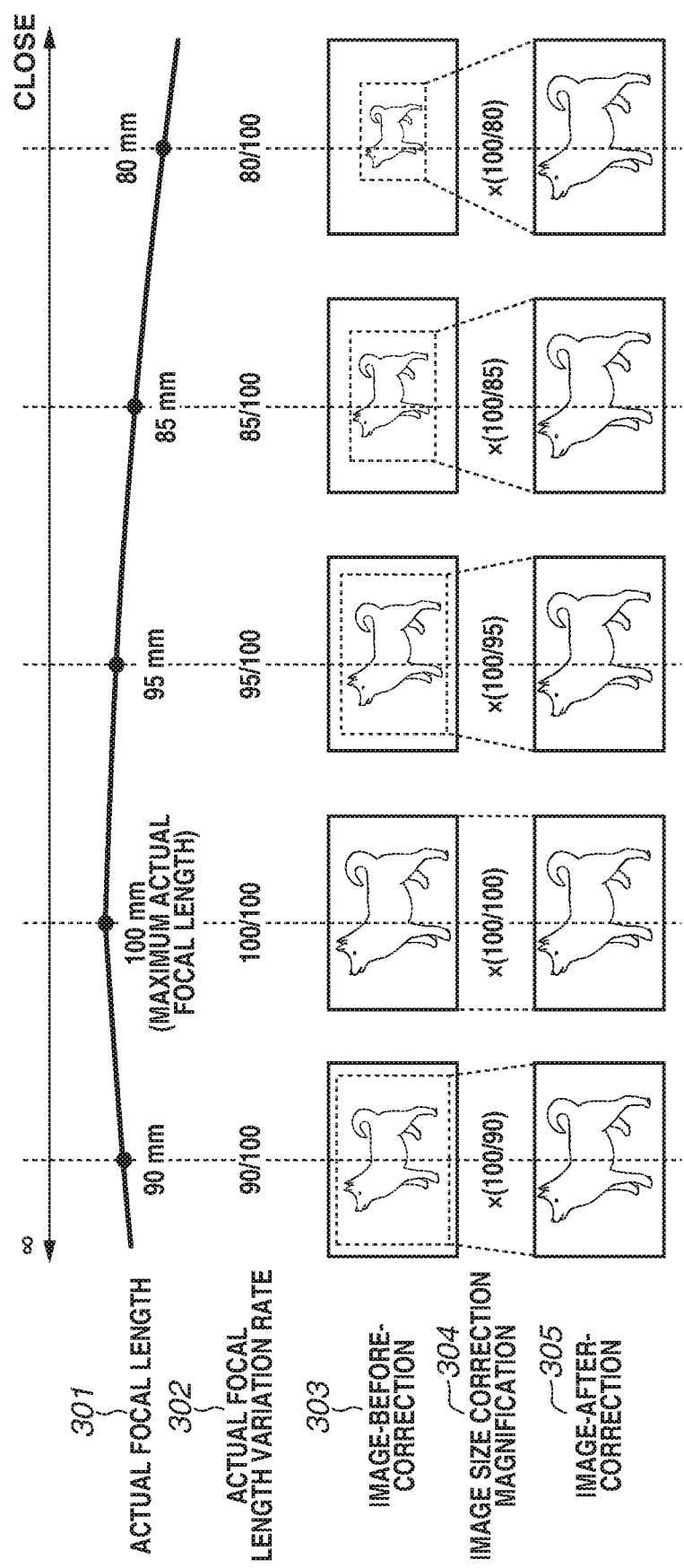
FIG. 3 is an image diagram illustrating an example of an effect of focus image magnification variation correction processing by the interchangeable camera-lens system according to the first exemplary embodiment.

Referring now to an image diagram in FIG. 3, a description will be provided of an effect of the process of correcting a variation in focus image magnification with the interchangeable camera-lens system according to the present exemplary embodiment.

An actual focal length 301 is a line illustrating an example of possible actual focal lengths within the drivable range of the focus lens 151 from infinity to close in a case in which the lens apparatus 150 is at a predetermined zoom position and in a predetermined aperture state. The actual focal length that is the maximum value at this time is the maximum actual focal length.

An actual focal length variation rate 302 illustrates examples of the values of the actual focal length variation rate at predetermined focus lens positions.

An image-before-correction 303 illustrates examples of images captured at the predetermined focus lens positions. The example illustrates how the angle of view of the subject at the same distance varies as the actual focal length differs depending on the focus lens position.

An image size correction magnification 304 illustrates examples of the image size correction magnification calculated based on the actual focal length variation rate. While the image size correction magnification is the inverse of the actual focal length variation rate in the present exemplary embodiment, the image size correction magnification is not limited thereto and can be obtained by, for example, applying a predetermined coefficient to the inverse.

An image-after-correction 305 illustrates examples of images having been subjected to resizing processing on the image-before-correction 303 based on the image size correction magnification. The resizing processing is referred to as focus image magnification variation correction processing.

As illustrated in the above-described effect examples, an interchangeable camera-lens system capable of improving moving image quality is realized through focus image magnification variation correction processing.

Figure 4:
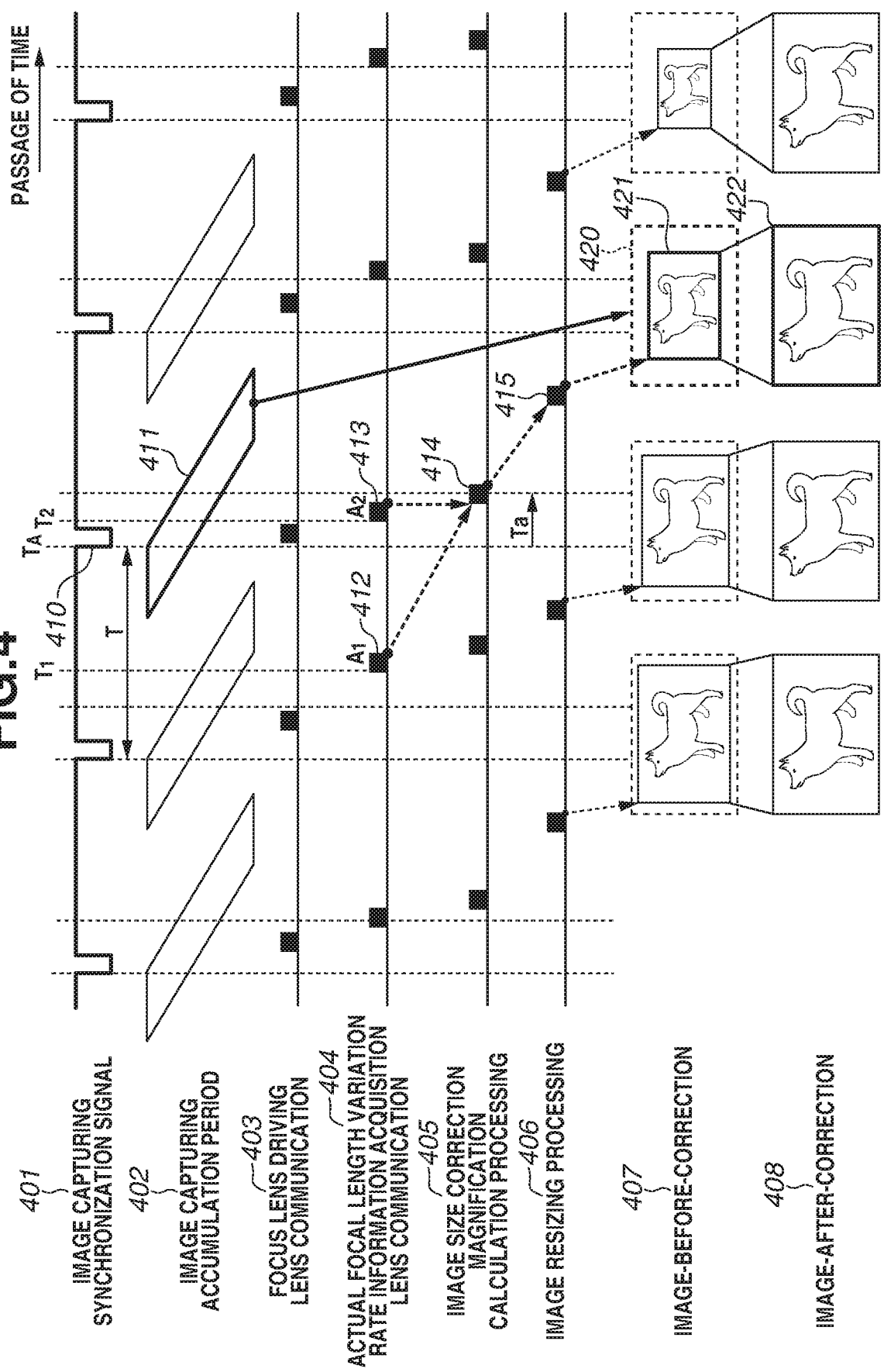
FIG. 4 is a chart illustrating timings of focus image magnification variation correction processing by an image capturing apparatus and a lens apparatus according to the first exemplary embodiment.

Referring now to a timing chart in FIG. 4, a description will be provided of timings of focus image magnification variation correction processing of the interchangeable camera-lens system according to the present exemplary embodiment.

An image capturing synchronization signal 401 is a synchronization signal output from the timing generation unit 104 at a period T.

An image capturing accumulation period 402 is an accumulation period of the image sensor 102, and reading is sequentially started from a top portion of a screen in response to the image capturing synchronization signal 401.

Focus lens driving lens communication 403 is a timing at which the focus lens control amount calculated through the AF processing performed in step S202 is communicated to the lens apparatus 150.

Actual focal length variation rate information acquisition lens communication 404 is a timing at which lens communication is performed to acquire the actual focal length variation rate information from the lens apparatus 150 in step S205.

Image size correction magnification calculation processing 405 is a timing at which the image size correction magnification is calculated in step S206.

Focus image magnification variation correction processing 406 is a timing at which resizing processing is performed in step S207.

An image-before-correction 407 is an image that is output from the image sensor 102 and has not been subjected to focus image magnification variation correction.

An image-after-correction 408 is an image acquired by focus image magnification variation correction being performed on the image-before-correction 407.

For example, in response to an image capturing synchronization signal 410 at a time point $T_A$, the images accumulated by the image sensor 102 during an image capturing accumulation period 411 are output, whereby an image-before-correction 420 is acquired. The timing of the center of the image capturing accumulation period 411 is later by a timing $T_a$ than the time point $T_A$. Actual focal length variation rate information acquisition lens communication 412 and actual focal length variation rate information acquisition lens communication 413 are respectively performed at time points $T_1$ and $T_2$, and the received actual focal length variation rates are respectively rates $A_1$ and $A_2$. Thereafter, image size correction magnification calculation processing 414 is executed. At this time, an estimated actual focal length variation rate A at a time point $T_A+T_a$ is calculated using formula (2) below.

[Formula 2]

$$A = \frac{A_2 - A_1}{T_2 - T_1} \cdot \frac{T_A + T_a - T_1}{T_2 - T_1} \qquad (2)$$

Image resizing processing 415 is performed based on the estimated actual focal length variation rate A, and a region image 421 in the image-before-correction 420 is cut off, and an image-after-correction 422 is output.

By repeating the above-described processing, the image size correction magnification independent of the image capturing accumulation period and the timing of the actual focal length variation rate information is acquired, and the focus image magnification variation correction processing is realized.

While formula (2) is used to calculate the estimated actual focal length variation rate A according to an aspect of the present exemplary embodiment, the present exemplary embodiment is not limited thereto. If a specific condition is satisfied, the estimated actual focal length variation rate A is calculated using formula (2), whereas if the specific condition is not satisfied, the estimated actual focal length variation rate A is calculated using formula (3) below.

[Formula 3]

$$A = A_2 \qquad (3)$$

For example, according to another aspect of the present exemplary embodiment, the estimated actual focal length variation rate A is calculated using formula (2) if the image plane speed of the subject is faster than a predetermined threshold value, whereas the estimated actual focal length variation rate A is calculated using formula (3) if the image plane speed is not faster than the predetermined threshold value.

According to yet another aspect of the present exemplary embodiment, the estimated actual focal length variation rate A is calculated using formula (2) if the actual focal length variation rate received from the lens apparatus 150 is greater than a predetermined threshold value, whereas the estimated actual focal length variation rate A is calculated using formula (3) if the received actual focal length variation rate is not greater than the predetermined threshold value.

According to even yet another aspect of the present exemplary embodiment, the estimated actual focal length variation rate A is calculated using formula (2) if the frame rate of the image signal output from the image sensor 102 is less than a predetermined threshold value, whereas the estimated actual focal length variation rate A may be calculated using formula (3) if the frame rate is less than the predetermined threshold value. Yet alternatively, the estimated actual focal length variation rate A is calculated using formula (2) if the driving direction of the last focus lens driving lens communication 403 is the same as the driving direction of the current focus lens driving lens communication 403, whereas the estimated actual focal length variation rate A is calculated using formula (3) if the driving directions are not the same.

The timing $T_a$ is not limited to the center of the image capturing accumulation period 411 and may be defined as a timing before the image resizing processing 415. While the estimated actual focal length variation rate A is calculated using formula (2) in the present exemplary embodiment, a formula with which two or more actual focal length variation rates of the past are calculated can be used.

Referring now to FIG. 5, a description will be provided of an actual focal length variation rate information table for use in acquiring actual focal length variation rate information in the present exemplary embodiment.

The lens apparatus 150 according to the present exemplary embodiment holds the actual focal length variation rate information table. The actual focal length variation rate information is calculated based on the image capturing optical system state and the actual focal length variation rate information table and is transmitted to the image capturing apparatus 100. This configuration enables the image capturing apparatus 100 to calculate the image size correction magnification and realize the focus image magnification variation correction processing.

In a column 501, elements for deriving the actual focal length variation rate information are indicated, and position information about each member of the image capturing optical system of the lens apparatus 150 is included as an element.

In a column 502, the actual focal length variation rate information derived from the elements is indicated.

In a column 503, the position of the zoom lens 152 among the elements is indicated.

In a column 504, the value of the diaphragm 153 (aperture) among the elements is indicated.

In a column 505, the position of the focus lens 151 among the elements is indicated.

In a column 506, the actual focal length among the actual focal length variation rate information derived from the elements is indicated.

In a column 507, the maximum actual focal length among the actual focal length variation rate information derived from the elements is indicated.

For example, in a case where the positions of the zoom lens 152, the diaphragm 153, and the focus lens 151 are positions Zm_0 (508), Av_0 (509), and Fcs_0 (510), respectively, the actual focal length is FL_000 (511) and the maximum actual focal length is MaxFL_00 (512). Thus, the actual focal length variation rate is calculable using formula (1) described above.

The position information about the members of the image capturing optical system as the elements is not limited to those described above. The position information may include the position of the image stabilization control lens 154, for example.

The actual focal length variation rate information is not limited to those described above and can be any information from which the actual focal length variation rate is calculable. For example, the actual focal length variation rate without change may be included.

The actual focal length variation rate information table may be transmitted from the lens apparatus 150 to the image capturing apparatus 100. In such a case, the position information about the members of the image capturing optical system is transmitted from the lens apparatus 150 to the image capturing apparatus 100, and the image capturing apparatus 100 performs data retrieval from the actual focal length variation rate information table.

The actual focal length variation rate information table is held so that the actual focal length variation rate information can be acquired.

According to the above-described exemplary embodiments, the actual focal length variation rate information is transmitted from the lens apparatus 150 to the image capturing apparatus 100, where the amount of a variation in angle of view due to a variation in actual focal length caused by focus lens driving is calculable with the actual focal length variation rate. This configuration achieves the interchangeable camera-lens system having the focus image magnification variation correction function with which variation in angle of view caused by the focus lens driving is correctable for a captured image. This configuration also achieves the interchangeable camera-lens system having the focus image magnification variation correction function independent of the timing at which the image capturing apparatus 100 acquires the actual focal length variation rate information from the lens apparatus 150.

A second exemplary embodiment of the disclosure will be described below. According to the present exemplary embodiment, the focus lens driving is temporarily prohibited when the focus lens driving direction is reversed. The first exemplary embodiment is characterized in that the estimated actual focal length variation rate is calculated using two or more actual focal length variation rates of the past and resizing processing is performed based on the estimated actual focal length variation rate. The estimated actual focal length variation rate, however, does not always match the actual focal length variation rate when the focus lens driving direction is reversed.

Thus, in the second exemplary embodiment, a description will be provided of the interchangeable camera-lens system that is different from that of the first exemplary embodiment in that the focus lens driving is temporarily prohibited when the focus lens driving direction is reversed, which is a characterizing feature in the present exemplary embodiment. Description of a similar configuration to that in the first exemplary embodiment is omitted, and mainly a difference will be described below.

Figure 6:
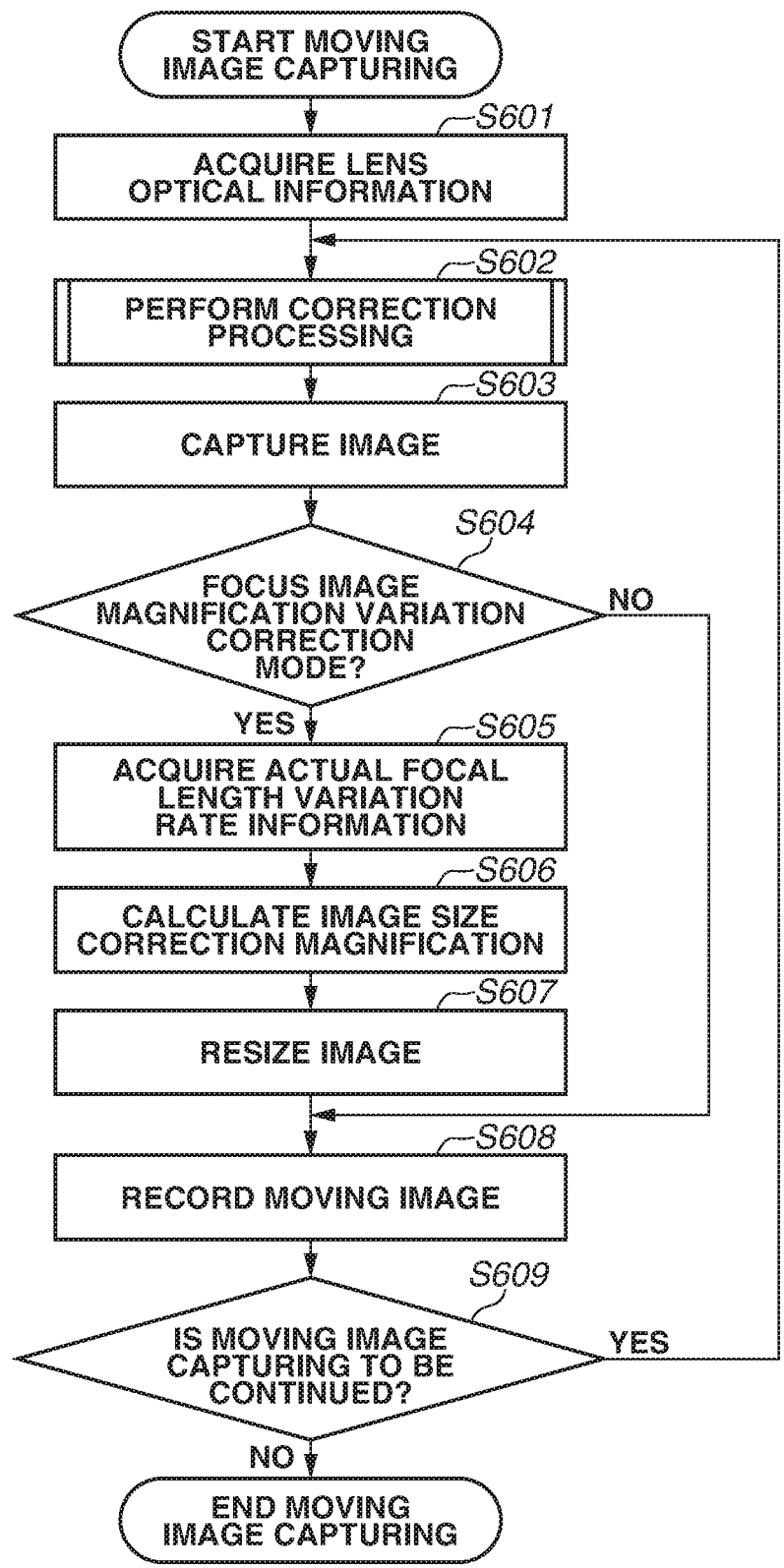
FIG. 6 is a flowchart illustrating a process of capturing a moving image by an interchangeable camera-lens system according to a second exemplary embodiment.

Operations of the image capturing apparatus 100 and the lens apparatus 150 according to the present exemplary embodiment will be described below with reference to a flowchart in FIG. 6. The moving image capturing start processing is the processing at the time of a start of moving image capturing by the image capturing apparatus 100.

Step S601 is similar to step S201, and thus a description thereof is omitted.

In step S602, correction processing is performed. Details thereof will be described below with reference to FIG. 7.

Steps S603 to S609 are similar to steps S203 to S209, and thus a description thereof is omitted.

Figure 7:
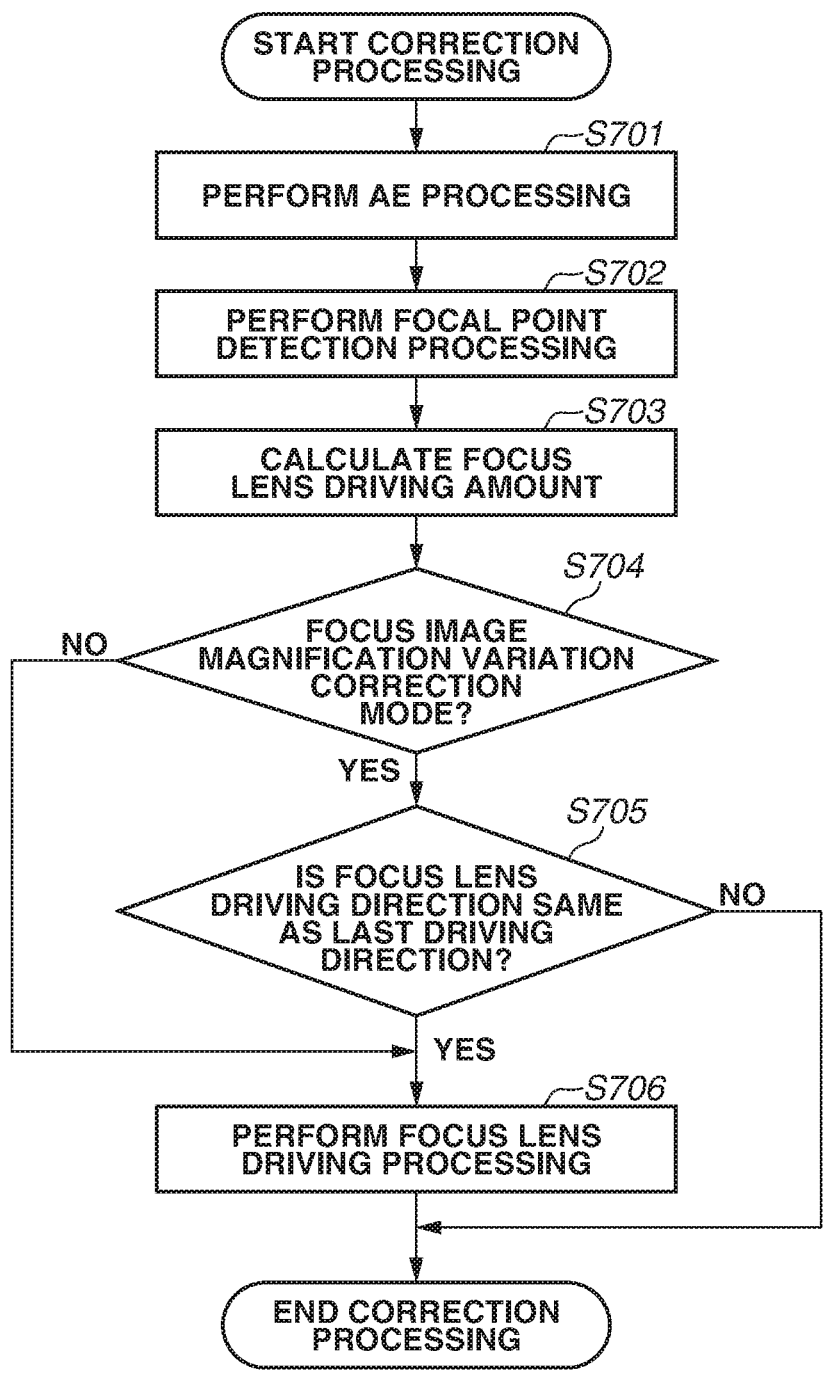
FIG. 7 is a flowchart illustrating a correction process by an image capturing apparatus according to the second exemplary embodiment.

Next, the correction processing in step S602 will be described below with reference to a flowchart in FIG. 7.

In step S701, the system control unit 130 controls the AE control unit 132 to thereby perform AE processing, and the processing proceeds to step S702. In the AE processing, the lens control amount is calculated based on the lens optical information and, when necessary, the lens information acquired from the lens apparatus 150, and control instruction communication is performed with respect to the lens apparatus 150.

In step S702, the system control unit 130 controls the focal point detection unit 135 to thereby perform focal point detection processing, and the processing proceeds to step S703. The image capturing surface phase difference AF method is assumed to be used in the AF processing according to the present exemplary embodiment, and the defocus amount is detected through the focal point detection processing.

In step S703, the system control unit 130 controls the focal point adjustment unit 136 to thereby calculate the driving amount of the focus lens 151 based on a result of the focal point detection performed by the focal point detection unit 135, and the processing proceeds to step S704.

In step S704, the system control unit 130 determines whether the image capturing apparatus 100 is in the focus image magnification variation correction mode. If it is the focus image magnification variation correction mode (YES in step S704), the processing proceeds to step S705. If not (NO in step S704), the processing proceeds to step S706.

In step S705, the system control unit 130 determines whether the driving direction based on the driving amount of the focus lens 151 that is calculated in step S703 is the same as the last driving direction. If the driving direction based on the driving amount of the focus lens 151 that is calculated in step S703 is the same as the last driving direction (YES in step S705), the processing proceeds to step S706. If not (NO in step S705), the correction process ends. At this time, the focus lens driving processing is temporarily stopped in the case where the direction is different from the last driving direction, because it can be considered that the estimated actual focal length variation rate calculated in step S606 does not match the focus lens driving.

In step S706, the system control unit 130 communicates the driving amount of the focus lens 151 that is calculated in step S703 to the lens apparatus 150. The Lens control unit 160 controls driving of the focus lens 151 based on the driving amount.

Figure 8:
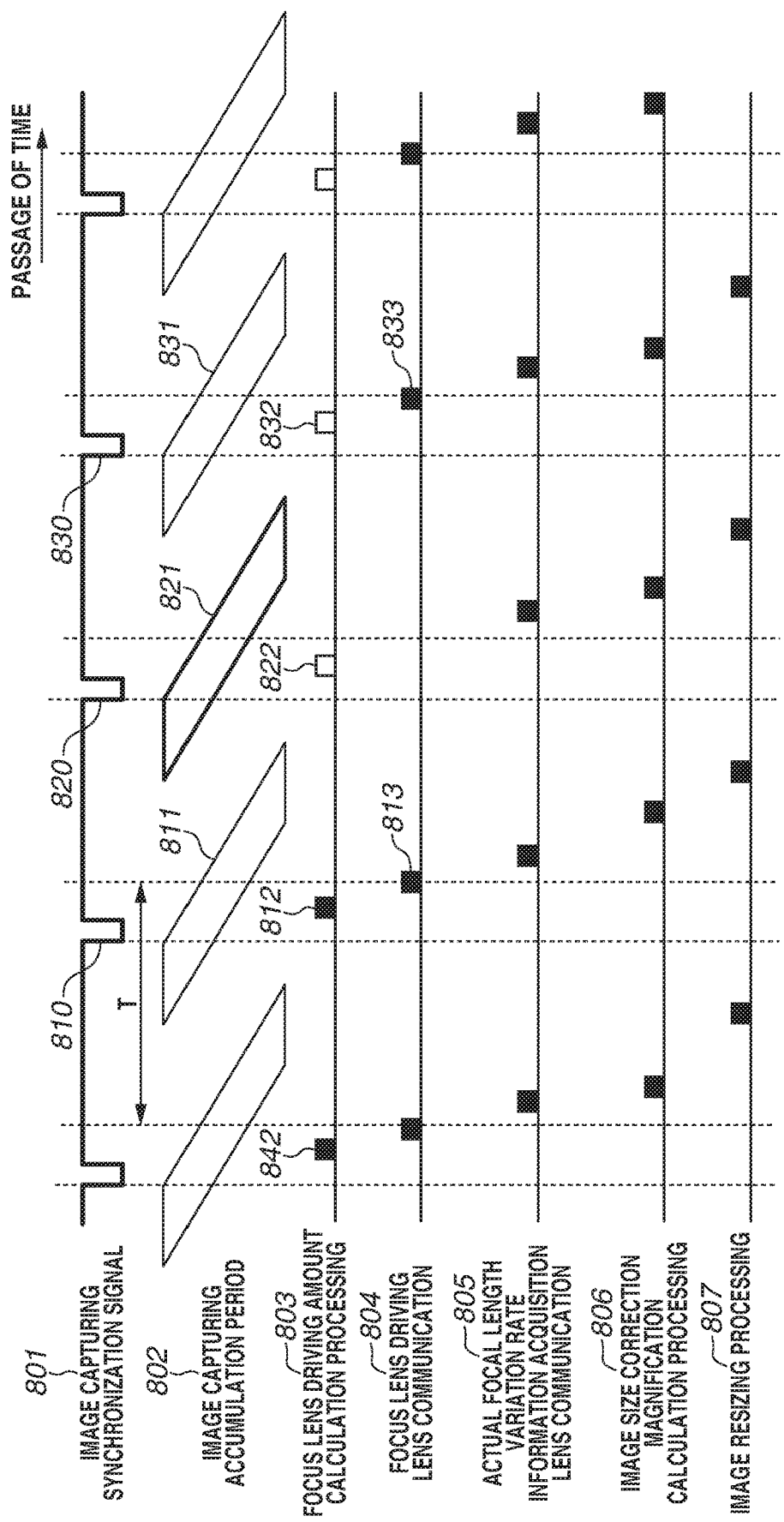
FIG. 8 is a chart illustrating timings of focus image magnification variation correction processing and focus lens driving lens communication by the image capturing apparatus and a lens apparatus according to the second exemplary embodiment.

Next, timings of focus image magnification variation correction processing and the focus lens driving lens communication of the interchangeable camera-lens system according to the present exemplary embodiment will be described below with reference to a timing chart in FIG. 8.

An image capturing synchronization signal 801 is similar to the image capturing synchronization signal 401, and thus a description thereof is omitted.

An image capturing accumulation period 802 is similar to the image capturing accumulation period 402, and thus a description thereof is omitted.

Focus lens driving amount calculation processing 803 is a timing at which the focus lens driving amount calculation is performed in step S703.

Focus lens driving lens communication 804 to image resizing processing 807 are similar to the focus lens driving lens communication 403 to the image resizing processing 406, and thus a description thereof is omitted.

For example, in response to an image capturing synchronization signal 810, the images accumulated by the image sensor 102 during an image capturing accumulation period 811 are output. Focus lens driving amount calculation processing 812 is performed based on part of the output, and the driving amount in the closest distance direction is calculated. Here, focus image magnification variation processing is enabled and the driving direction is the same as the driving direction acquired in last focus lens driving calculation processing 842. Thus, focus lens driving lens communication 813 is performed. Next, in response to an image capturing synchronization signal 820, the images accumulated by the image sensor 102 during an image capturing accumulation period 821 are output. Focus lens driving amount calculation processing 822 is performed based on part of the output, and the driving amount in the infinity direction is calculated. Here, while focus image magnification variation processing is enabled, it is determined in step S705 that the driving direction is different from the driving direction acquired in the last focus lens driving calculation processing 812. Thus, the focus lens driving lens communication 804 is not performed. Next, in response to an image capturing synchronization signal 830, the image sensor 102 outputs images accumulated during an image capturing accumulation period 831. Focus lens driving amount calculation processing 832 is performed based on part of the output, and the driving amount in the infinity direction is calculated. Here, the focus image magnification variation processing is enabled and the driving direction is the same as the driving direction acquired in the last focus lens driving calculation processing 822. Thus, focus lens driving lens communication 833 is performed.

According to the above-described exemplary embodiment, the interchangeable camera-lens system is realizable that is capable of realizing the focus image magnification variation correction processing in consideration of the reversing of the focus lens driving direction.

A third exemplary embodiment of the disclosure will be described below. The present exemplary embodiment is directed to increasing a frequency of acquiring the actual focal length variation rate in a case where the image plane speed of the subject is faster than a predetermined threshold value, compared with a case where the image plane speed is slower than the predetermined threshold value.

The first exemplary embodiment is characterized in that the estimated actual focal length variation rate is calculated using two or more actual focal length variation rates of the past and resizing processing is performed based on the estimated actual focal length variation rate. The estimated actual focal length variation rate however does not always match the actual focal length variation rate, because the focus lens driving is large when the image plane speed of the subject is fast.

Thus, the third exemplary embodiment is characterized in that the actual focal length variation rate is acquired more frequently in the case in which the image plane speed of the subject is faster than the predetermined threshold value than in the case in which the image plane speed is slower than the predetermined threshold value. Description of similar points to those in the first exemplary embodiment is omitted, and mainly a difference will be described below.

Figure 9:
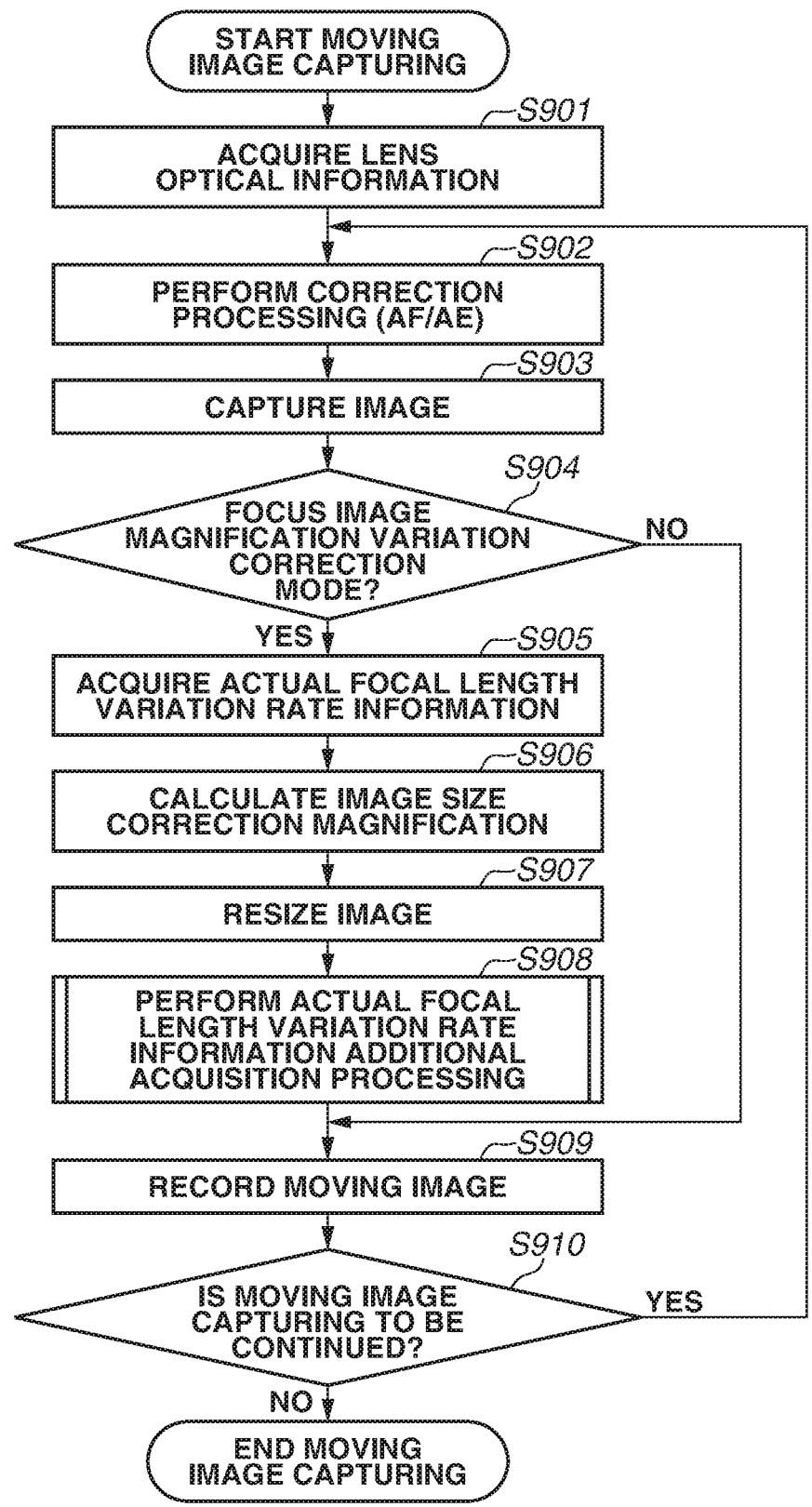
FIG. 9 is a flowchart illustrating a process of capturing a moving image by an interchangeable camera-lens system according to a third exemplary embodiment.

Operations of the image capturing apparatus 100 and the lens apparatus 150 according to the present exemplary embodiment will be described below with reference to a flowchart in FIG. 9. The moving image capturing start processing is the processing at the time of a start of moving image capturing by the image capturing apparatus 100.

Steps S901 to S907 are similar to steps S201 to S207, so that description thereof is omitted.

In step S908, actual focal length variation rate information additional acquisition processing is performed. Details thereof will be described below with reference to FIG. 10.

Steps S909 and S910 are similar to steps S208 and S209, so that description thereof is omitted.

Next, the actual focal length variation rate information additional acquisition processing in step S908 will be described below with reference to a flowchart in FIG. 10.

In step S1001, the system control unit 130 determines whether the image plane speed of the subject that is calculated in step S902 is faster than the predetermined threshold value. If the image plane speed of the subject is faster than the predetermined threshold value (YES in step S1001), the processing proceeds to step S1002. If not (NO in step S1001), the actual focal length variation rate information additional acquisition processing ends. In the case where the image plane speed of the subject is fast, the focus lens 151 is also driven fast. Thus, change in actual focal length variation rate is not greater than that in the case where the focus lens 151 is driven slow. Thus, additionally acquiring the more recent actual focal length variation rate enables more accurate calculation of the angle-of-view correction magnification.

Referring now to a timing chart in FIG. 11, a description will be provided of timings of the actual focal length variation rate acquisition lens communication of the interchangeable camera-lens system according to the present exemplary embodiment.

An image capturing synchronization signal 1101 to image resizing processing 1107 are similar to the image capturing synchronization signal 801 to image resizing processing 1107, and thus a description thereof is omitted.

Actual focal length variation rate information additional acquisition processing 1108 is a timing at which actual focal length variation rate information additional acquisition processing is performed in step S908.

For example, in response to an image capturing synchronization signal 1110, the image sensor 102 outputs the images accumulated during an image capturing accumulation period 1111. Actual focal length variation rate acquisition lens communication 1112 is performed in step S905. Image size correction magnification calculation processing 1113 is performed in step S906. Image resizing processing 1114 is performed in step S907. While actual focal length variation rate information additional acquisition processing 1115 is performed in step S908, because it is assumed to be determined that the image plane speed of the subject is slower than the predetermined threshold value, actual focal length variation rate acquisition lens communication 1105 is not performed.

Next, in response to an image capturing synchronization signal 1120, the image sensor 102 outputs the images accumulated during an image capturing accumulation period 1121. Actual focal length variation rate acquisition lens communication 1122 is performed in step S905. While actual focal length variation rate information additional acquisition processing 1123 is performed in step S908, because it is assumed to be determined that the image plane speed of the subject is faster than the predetermined threshold value, actual focal length variation rate acquisition lens communication 1124 is performed.

According to the above-described exemplary embodiment, the focus image magnification variation correction function in consideration of the image plane speed of the subject is realizable.

While the acquisition frequency for the actual focal length variation rate information is changed depending on the image plane speed of the subject in the present exemplary embodiment, the present exemplary embodiment is not limited thereto. For example, according to another aspect of the present exemplary embodiment, the actual focal length variation rate information is acquired more frequently in a case where the actual focal length variation rate received by the lens apparatus 150 is greater than a predetermined threshold value. This takes into account that, as change in actual focal length variation rate increases, deviation of the estimated actual focal length variation rate from the actual focal length variation rate increases.

According to yet another aspect of the present exemplary embodiment, the actual focal length variation rate information is acquired more frequently if the frame rate of the image signal output from the image sensor 102 is less than a predetermined threshold value.

According to each of the first to third exemplary embodiments, the interchangeable camera-lens system is provided with the focus image magnification variation correction function applied to various operations. The disclosure is not limited to the exemplary embodiments described above, and various modifications and changes are possible.

While various exemplary embodiments of the disclosure have been described, various changes are possible.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-142903, filed Jul. 30, 2018, which is hereby incorporated by reference herein in its entirety.

What is claimed is:

1. An image capturing apparatus to which a lens apparatus including a focus lens is attachable, the image capturing apparatus comprising:
   a sensor configured to photoelectrically convert light received via the lens apparatus; and
   at least one processor configured to perform the operations of the following units:
   a generation unit configured to generate an image based on an image signal output from the sensor;
   a detection unit configured to detect a focal point state based on the image signal output from the sensor;
   a first calculation unit configured to calculate, based on the detected focal point state, an image plane speed of a subject and a driving direction of the focus lens;
   a first control unit configured to control driving of the focus lens based on a result of the calculation performed by the first calculation unit;
   a second control unit configured to receive, from the lens apparatus, information corresponding to a variation rate of a focal length at a current position of the focus lens with respect to a maximum possible focal length within a drivable range of the focus lens;
   a second calculation unit configured to calculate, using the information of a past, an angle-of-view correction magnification of the image at a time point of exposure of the sensor; and
   a resizer configured to change an angle of view of the image based on the angle-of-view correction magnification.

2. The image capturing apparatus according to claim 1, wherein, in a case where the detection unit determines that the focus lens is to be moved in a direction different from a last driving direction, the second calculation unit calculates the angle-of-view correction magnification of the image using the information that is most recently received from the second control unit.

3. The image capturing apparatus according to claim 1, wherein, in a case where the calculated driving direction of the focus lens is different from a last driving direction of the focus lens, the first control unit temporarily prohibits driving of the focus lens.

4. The image capturing apparatus according to claim 1, wherein the second control unit sets a frequency of receiving the information higher in a case where the variation rate of the focal length exceeds a threshold value than in a case where the variation rate of the focal length does not exceed the threshold value.

5. The image capturing apparatus according to claim 1, wherein the second control unit sets a frequency of receiving the information higher in a case where the image plane speed of the subject calculated by the first calculation unit exceeds a threshold value than in a case where the image plane speed of the subject does not exceed the threshold value.

6. The image capturing apparatus according to claim 1, wherein the second control unit sets a frequency of receiving the information higher in a case where a frame rate of the image signal output from the sensor does not exceed a threshold value than in a case where the frame rate exceeds the threshold value.

7. A method of an image capturing apparatus to which a lens apparatus including a focus lens is attachable and which includes a sensor configured to photoelectrically convert an optical image received via the lens apparatus, the method comprising:
   generating an image based on an image signal output from the sensor;
   detecting a focal point state based on the image signal output from the sensor;
   calculating, as a first calculation, an image plane speed of a subject and a driving direction of the focus lens based on the detected focal point state;
   controlling driving of the focus lens based on a result of the first calculation;
   receiving, as a lens communication control, information from the lens apparatus, information corresponding to a variation rate of a focal length at a current position of the focus lens with respect to a maximum possible focal length within a drivable range of the focus lens;
   calculating, as a second calculation, an angle-of-view correction magnification of the image at a timing corresponding to exposure of the sensor using the information of a past; and
   changing, as a resizing, an angle of view of the image based on the angle-of-view correction magnification.

8. The method according to claim 7, wherein, in a case where the detecting determines that the focus lens is to be moved in a direction different from a last driving direction, the second calculation calculates the angle-of-view correction magnification of the image using the information that is most recently received from the controlling.

9. The method according to claim 7, wherein, in a case where the calculated driving direction of the focus lens is different from a last driving direction of the focus lens, the controlling temporarily prohibits driving of the focus lens.

10. The method according to claim 7, wherein the controlling sets a frequency of receiving the information higher in a case where the variation rate of the focal length exceeds a threshold value than in a case where the variation rate of the focal length does not exceed the threshold value.

11. The method according to claim 7, wherein the controlling sets a frequency of receiving the information higher in a case where the image plane speed of the subject calculated by the first calculation exceeds a threshold value than in a case where the image plane speed of the subject does not exceed the threshold value.

12. The method according to claim 7, wherein the controlling sets a frequency of receiving the information higher in a case where a frame rate of the image signal output from the sensor does not exceed a threshold value than in a case where the frame rate exceeds the threshold value.

13. A non-transitory computer readable storage medium storing a computer-executable program of instructions for causing a computer to perform a method of an image capturing apparatus to which a lens apparatus including a focus lens is attachable and which includes a sensor configured to photoelectrically convert an optical image received via the lens apparatus, the method comprising:
   generating an image based on an image signal output from the sensor;
   detecting a focal point state based on the image signal output from the sensor;
   calculating, as a first calculation, an image plane speed of a subject and a driving direction of the focus lens based on the detected focal point state;
   controlling driving of the focus lens based on a result of the first calculation;
   receiving, as a lens communication control, information from the lens apparatus, information corresponding to a variation rate of a focal length at a current position of the focus lens with respect to a maximum possible focal length within a drivable range of the focus lens;

calculating, as a second calculation, an angle-of-view correction magnification of the image at a timing corresponding to exposure of the sensor using the information of a past; and changing, as a resizing, an angle of view of the image based on the angle-of-view correction magnification.

14. The non-transitory computer readable storage medium according to claim 13, wherein, in a case where the detecting determines that the focus lens is to be moved in a direction different from a last driving direction, the second calculation calculates the angle-of-view correction magnification of the image using the information that is most recently received from the controlling.

15. The non-transitory computer readable storage medium according to claim 13, wherein, in a case where the calculated driving direction of the focus lens is different from a last driving direction of the focus lens, the controlling temporarily prohibits driving of the focus lens.

16. The non-transitory computer readable storage medium according to claim 13, wherein the controlling sets a frequency of receiving the information higher in a case where the variation rate of the focal length exceeds a threshold value than in a case where the variation rate of the focal length does not exceed the threshold value.

17. The non-transitory computer readable storage medium according to claim 13, wherein the controlling sets a frequency of receiving the information higher in a case where the image plane speed of the subject calculated by the first calculation exceeds a threshold value than in a case where the image plane speed of the subject does not exceed the threshold value.

18. The non-transitory computer readable storage medium according to claim 13, wherein the controlling sets a frequency of receiving the information higher in a case where a frame rate of the image signal output from the sensor does not exceed a threshold value than in a case where the frame rate exceeds the threshold value.

* * * * *